US012688267B1

(12) United States Patent
Simmons et al.

(10) Patent No.: US 12,688,267 B1
(45) Date of Patent: Jul. 21, 2026

(54) SYSTEMS AND METHODS FOR MULTI-MODAL SEMANTIC IDENTITY AUTHENTICATION AND GOVERNANCE

(71) Applicant: Sovereignty Foundation Incorporated, Denver, CO (US)

(72) Inventors: Brady Bowen Simmons, Denver, CO (US); Pankaj Gera, Jaipur (IN)

( * ) Notice: Subject to any disclaimer, the term of this patent is extended or adjusted under 35 U.S.C. 154(b) by 39 days.

(21) Appl. No.: 19/308,229

(22) Filed: Aug. 23, 2025

Related U.S. Application Data

(60) Provisional application No. 63/801,581, filed on May 7, 2025.

(51) Int. Cl.
  *G06F 21/31*     (2013.01)
  *G06F 21/60*     (2013.01)

(52) U.S. Cl.
  CPC ............ *G06F 21/31* (2013.01); *G06F 21/604* (2013.01)

(58) Field of Classification Search
  None
  See application file for complete search history.

(56) References Cited

U.S. PATENT DOCUMENTS

| | | | | |
|---|---|---|---|---|
| 5,448,727 | A * | 9/1995 | Annevelink | .......... G06F 16/284 |
| 2004/0260699 | A1 * | 12/2004 | Aoki | ................... G06F 21/6227 |
| | | | | 707/999.009 |
| 2025/0252265 | A1 * | 8/2025 | Kotte | ..................... G06F 40/35 |
| 2025/0285471 | A1 * | 9/2025 | Sivakumar | ............. G06V 10/82 |

FOREIGN PATENT DOCUMENTS

| | | | | | |
|---|---|---|---|---|---|
| CN | | 108416275 | A * | 8/2018 | .......... G06V 40/166 |

* cited by examiner

*Primary Examiner* — Sanchit K Sarker
(74) *Attorney, Agent, or Firm* — Sam Pierce

(57) ABSTRACT

A computer-implemented system for semantic identity authentication and governance. The system receives multi-modal user input, including narrative, temporal, role, and location vectors, and fuses them into a composite semantic object ("Wisp") via a vector fusion module. The Wisp is assigned provenance metadata and stored in a persistent semantic memory graph or evaluated in real time against previously authenticated Wisps. Authentication is determined by calculating semantic coherence, trust, and drift scores, which are compared to governance thresholds. The system includes lifecycle management protocols for Wisp decay, archival, and removal. Embodiments support both stored Wisps and live-generated Wisps, enabling secure, context-aware identity verification resistant to spoofing. The methods, systems, and non-transitory computer-readable media disclosed herein enable dynamic, governance-aligned access control across distributed computing environments, including edge deployments, enterprise platforms, and defense applications.

20 Claims, 8 Drawing Sheets

Drift Detection Logic and Time-aware query handling

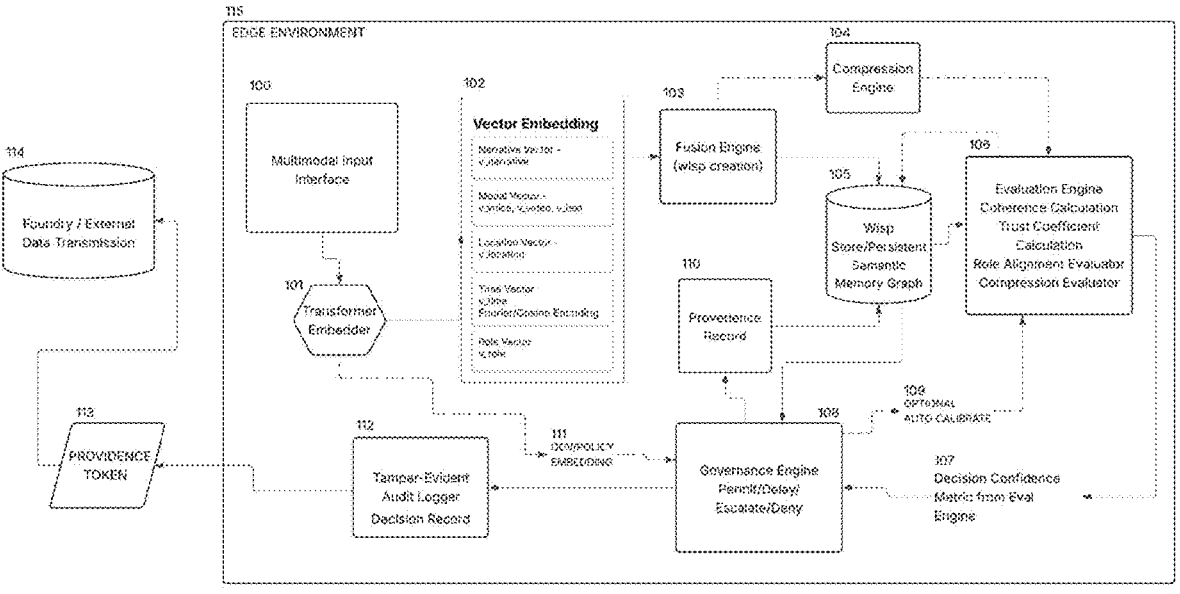
FIG. 1  Semantic Identity and Access Governance System

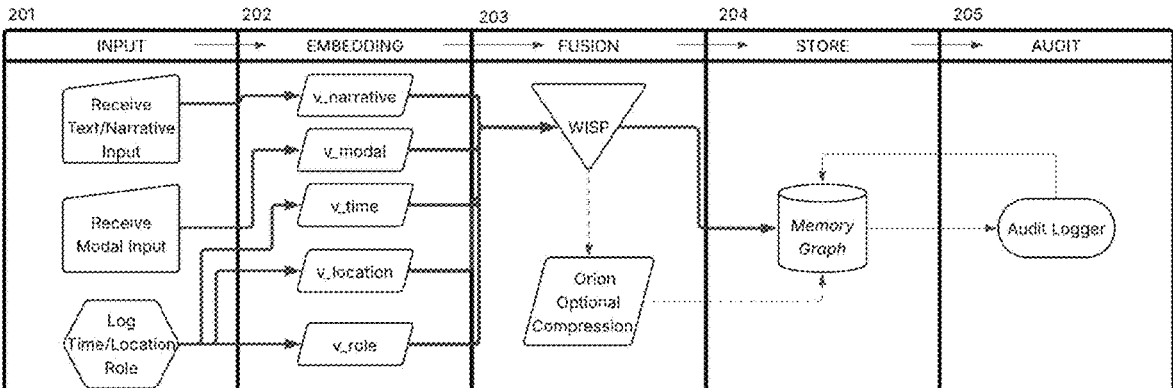
FIG. 2    User Input and Wisp Creation

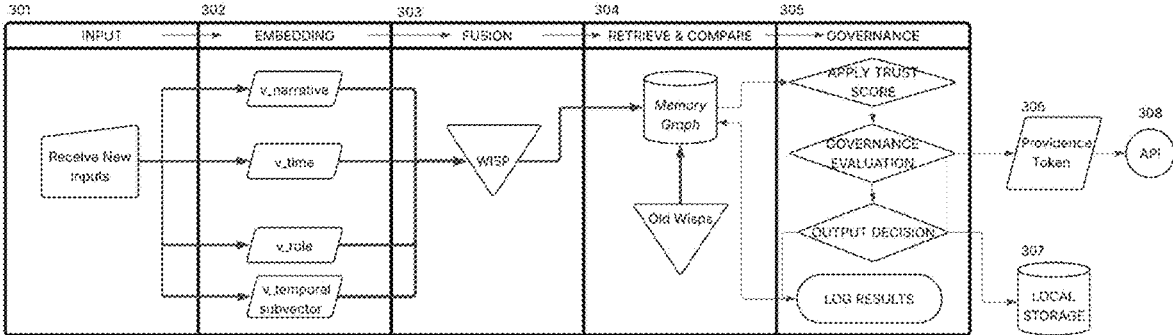
FIG. 3 Authentication Data Flow

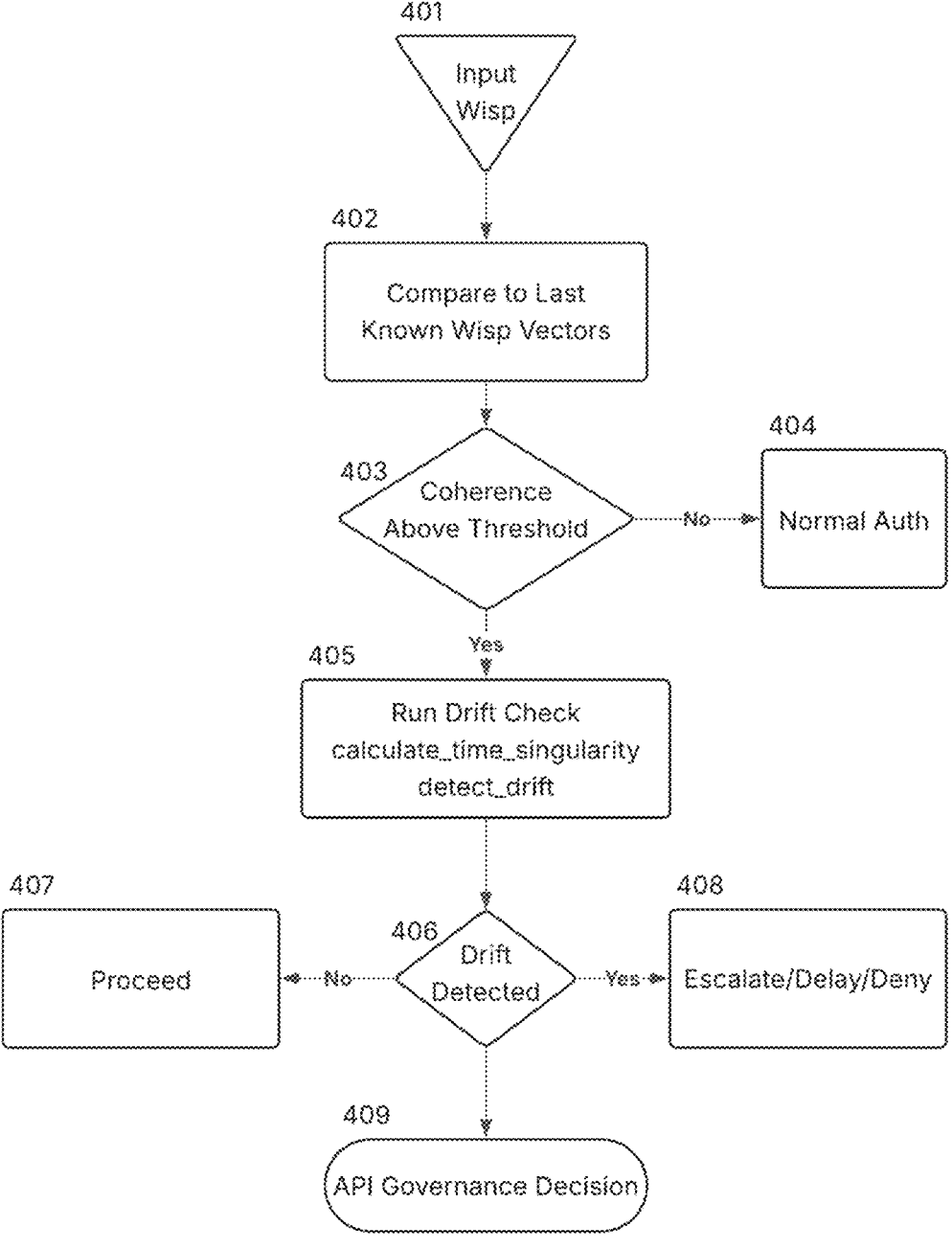
FIG. 4 Drift Detection Logic and Time-aware query handling

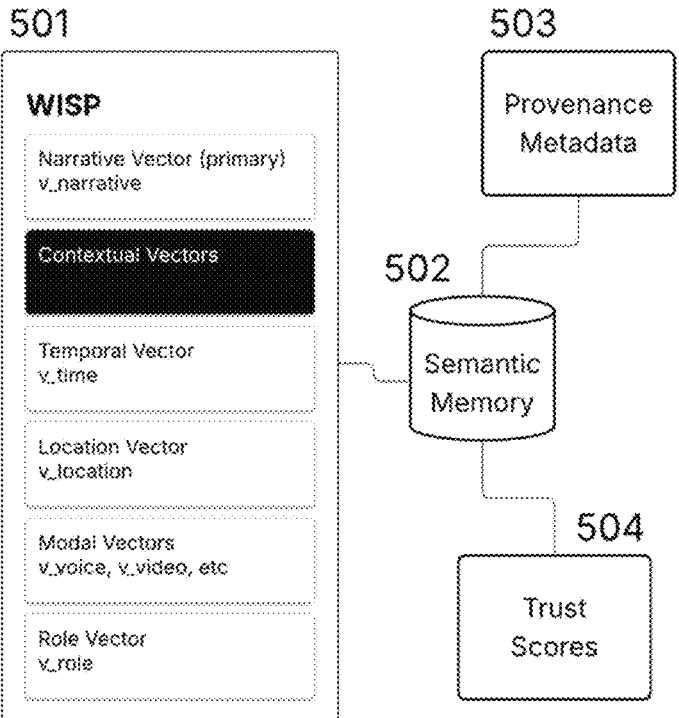
FIG. 5 - Wisp Object Schematic

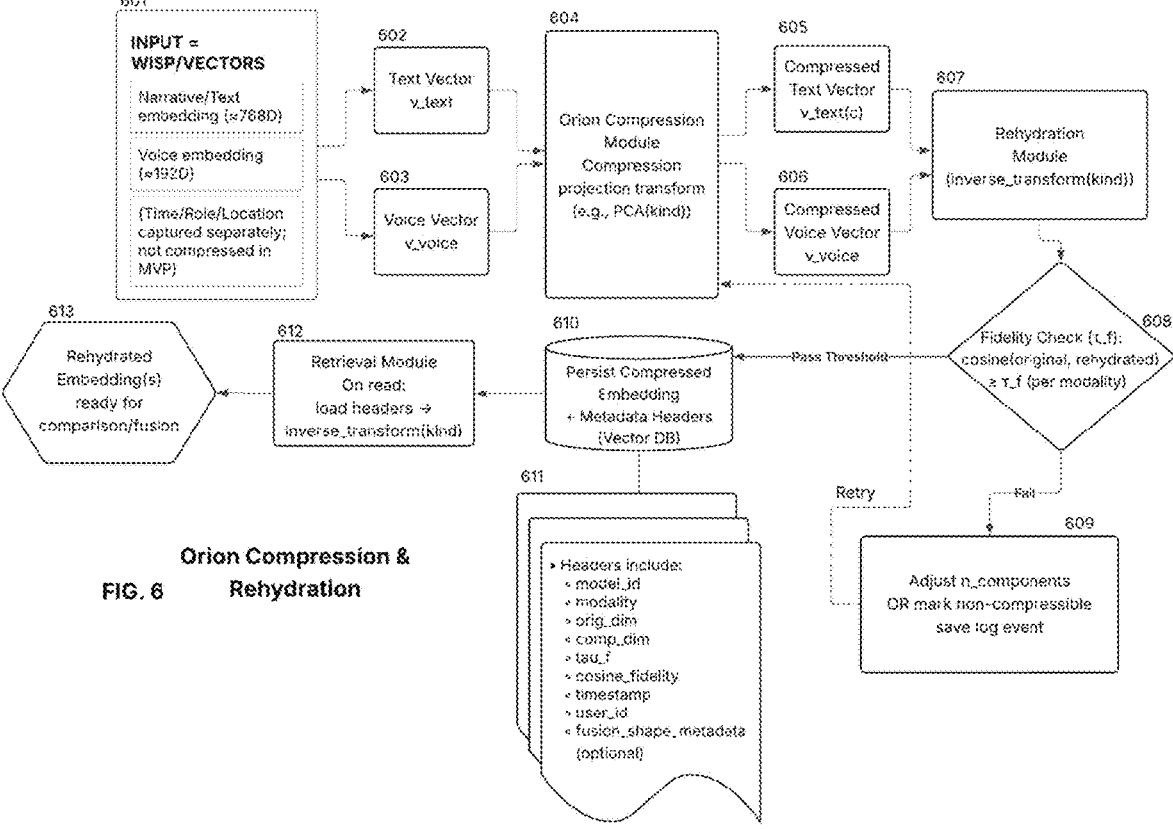
Orion Compression &
FIG. 6        Rehydration

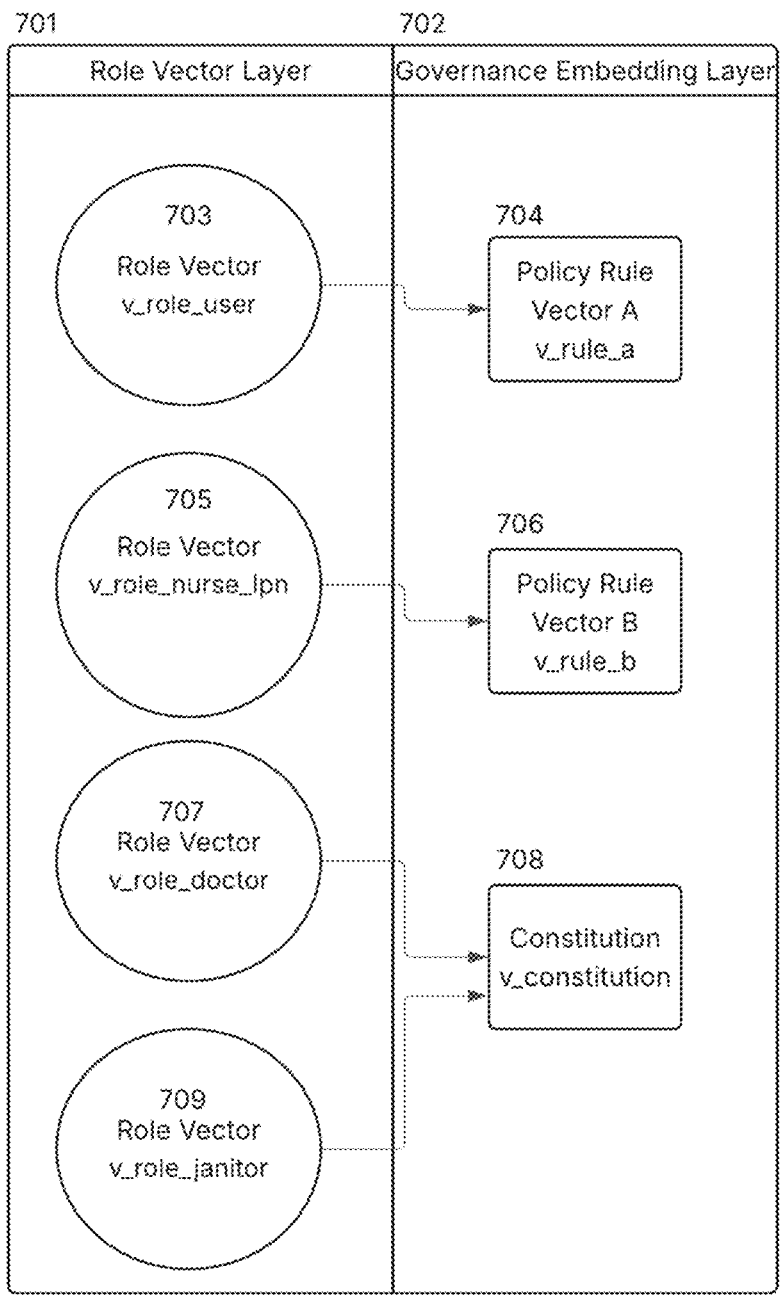
FIG. 7  Governance Embedding and Role Vectors (Dual Swim Lane)

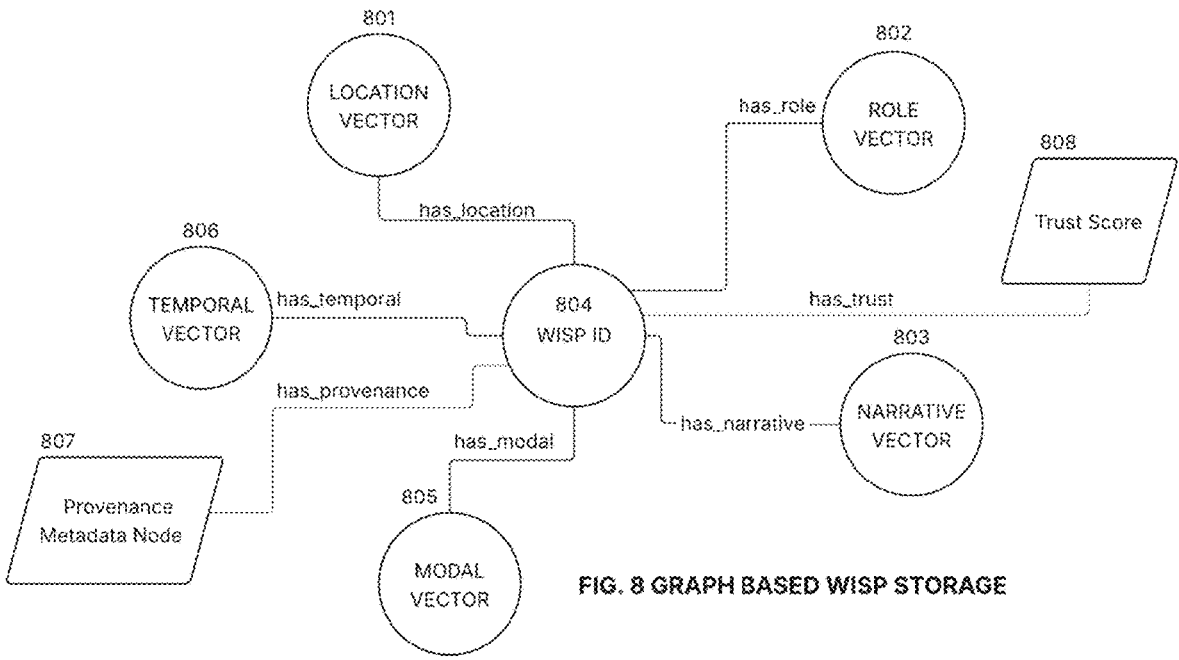
FIG. 8 GRAPH BASED WISP STORAGE

SYSTEMS AND METHODS FOR MULTI-MODAL SEMANTIC IDENTITY AUTHENTICATION AND GOVERNANCE

BACKGROUND

The present invention relates generally to computer-implemented systems and methods for identity authentication and access control. More particularly, it concerns the construction and use of composite, multi-modal vector representations of a user's live state-comprising narrative, contextual, and governance-related attributes—for real-time authentication and governance-controlled data transmission without reliance on static credentials.

Conventional identity authentication systems rely on static credentials such as passwords, hardware tokens, or stored biometric templates. These mechanisms create friction for users, are susceptible to theft, forgery, or replay attacks, and generally operate as one-time checks without ongoing evaluation of context or role.

Existing multi-factor approaches may combine different credential types, but they still rely on fixed, discrete data points that cannot adapt in real time to changes in user behavior, location, or environment. While some access control frameworks integrate role-based permissions, they rarely incorporate continuous, context-rich verification tied to a persistent record of identity state. Current systems also lack mechanisms to cryptographically bind execution-layer actions to a specific authenticated state without reliance on a central authority.

Key limitations in the current art include:

Problem 1: Password Burden

Static credentials require memorization, frequent changes, and manual resets, introducing user friction and operational inefficiency.

Problem 2: Spoofing Risk

Fixed credentials, whether physical or digital, can be stolen, forged, or replayed, enabling unauthorized access.

Problem 3: Lack of Context-Rich Memory

Legacy formats cannot represent identity in a manner that is semantically meaningful for governance or adapt to shifting operational context.

Problem 4: No Drift or Role Monitoring

Once authentication is granted, most systems fail to detect changes in user behavior, physical location, or assigned role that should impact authorization.

Problem 5: Absent Execution-Layer Governance

Governance checks are typically performed only at process initiation, without persistent monitoring of actions or embedding of provenance at the execution layer.

SUMMARY OF INVENTION

The disclosed technology provides a dynamic, multi-modal identity representation that is machine-readable, continuously verifiable, and governance-aligned. This representation-referred to as a composite identity object or WISP-fuses narrative input with contextual modalities such as temporal, spatial, and role vectors, producing a persistent, semantically structured record of identity state.

The present system is not merely an improvement to the accuracy of identity authentication; it is a structural redefinition of how identity is used in real-time governance decisioning.

In conventional systems, authentication is an isolated step that yields a static credential or token. That token is then presented to a separate access control mechanism, which applies static rules to permit or deny access. Such architectures inherently rely on stored secrets, are prone to credential theft, and cannot dynamically adjust to changes in the user's context or trustworthiness.

In contrast, the claimed system fuses narrative and contextual vectors with a temporally manifold-encoded vector, as illustrated in Appendices A, B, and C, into a composite identity object ("Wisp"). The temporal manifold decay function, described in detail in the referenced appendices, is applied during the fusion process rather than as a post-processing step. This integration ensures that the composite identity object embeds a temporally-weighted trust coefficient as a native vector component, enabling the object to reflect both semantic identity and dynamic trust state in a single fused representation. Governance decisioning then operates directly on the resulting composite identity object using one or more governance thresholds, as further illustrated in Appendix H, without reliance on static credentials or separate authentication tokens.

Because the Wisp contains both the identity representation and its dynamic trust state, the system can perform real-time governance decisioning —including permit, delay, escalate, or deny-without invoking any static credential, password, or token exchange. Access decisions are thus not based on whether the user "has" a secret, but on whether the user's live Wisp satisfies dynamic governance thresholds derived from semantic coherence, temporally decayed trust, and role alignment.

This architecture eliminates the separation between authentication and governance, enabling new security behaviors that cannot be replicated by conventional systems—for example, automatic escalation when a user's temporal manifold is phase-inconsistent with normal patterns, or selective denial when role vectors diverge from governance embeddings despite a successful identity match.

The invention addresses the limitations of conventional identity authentication systems as follows:

Addressing Password Burden

The WISP enables continuous, vector-based verification without requiring users to remember or periodically reset static credentials.

Addressing Spoofing Risk

By continuously updating and fusing multiple independent vectors, the WISP makes real-time impersonation computationally infeasible.

Addressing Lack of Context-Rich Memory

Identity state is encoded in a semantic memory graph that preserves temporal, spatial, role, and multi-modal relationships for context-aware governance and inference.

Addressing Lack of Drift or Role Monitoring

The system continuously evaluates behavioral, spatial, and role coherence, dynamically adapting permissions as conditions change.

Addressing Absent Execution-Layer Governance

Outbound actions are evaluated in real time against trust, drift, and policy embeddings. Approved actions are cryptographically bound to the authenticated state through a verifiable provenance token, enabling downstream validation without a central callback.

In one embodiment, each of the foregoing capabilities is implemented according to the method of claim 1, wherein governance-layer evaluation comprises computing semantic coherence, trust, drift, and optional role-alignment scores; evaluating those scores against governance thresholds and policy embeddings; selecting a decision state; and, when permitted, attaching a governance-bound provenance token to the outbound payload for independent downstream verification.

BRIEF DESCRIPTION OF THE DRAWINGS

FIG. 1 is a block diagram of a semantic identity authentication and governance-controlled data transmission system, showing multimodal input capture, embedding, Wisp creation, semantic memory storage, governance evaluation, and provenance token generation.

FIG. 2 is a process diagram illustrating one embodiment of multimodal input acquisition, embedding into narrative, temporal, role, location, and other contextual vectors, fusion into a Wisp with semantic header, storage in a semantic memory graph, and audit logging.

FIG. 3 is a process diagram showing authentication data flow, including temporal subvector computation with elapsed-time, decay coefficient, and phase features, Wisp fusion, retrieval and comparison to prior Wisps, governance evaluation, and permit-based provenance token attachment.

FIG. 4 is a flowchart illustrating drift detection logic and time-aware query handling, including semantic coherence scoring, drift checks using temporal and location vectors, governance decision states, and policy-based modifications to request handling.

FIG. 5 is a schematic of a Wisp object structure, showing narrative, temporal, location, modal, and role vectors, semantic header fields, storage in a semantic memory graph, provenance metadata, and trust score derivation.

FIG. 6 is a process diagram of an Orion compression and rehydration subsystem, showing modality-specific vector compression, fidelity evaluation, compression header generation, storage of compressed vectors, and rehydration for downstream processing.

FIG. 7 is a schematic illustrating the relationship between role vectors and governance embeddings, showing role-alignment scoring via weighted cosine similarity to governance policy vectors and constitutional embeddings.

FIG. 8 is a schematic of graph-based Wisp storage, showing typed edges connecting a Wisp node to narrative, role, temporal, location, modal, provenance, and trust score nodes, with temporal subvector details and provenance metadata maintained in a tamper-evident audit log.

DETAILED DESCRIPTION

Introduction to Vector Embeddings in WISP Construction

The following section describes how vector embeddings form the foundational relationships within the WISP data primitive. To understand the novel structure and operation of the invention, it is necessary to define several core concepts-namely:

Vector: An ordered array of numerical values representing a point in a high-dimensional space, where each dimension corresponds to a learned feature of the input data.

Embedding: A vector representation produced by a machine learning model that encodes semantic or contextual meaning of the input, enabling mathematical comparison between different inputs.

Transformer-based Embedding Model: A neural network architecture that processes sequential or multi-modal data using self-attention mechanisms to generate embeddings that preserve semantic relationships across contexts.

Similarity Metric: A mathematical function that quantifies the degree of correspondence between two vectors. In certain embodiments, this includes cosine similarity (measuring the angle between vectors), weighted cosine similarity (applying weights to vector dimensions for governance-based role alignment), and vector similarity (a generalized measure for comparing governance embeddings), as recited in claims 2-4.

These elements interact to represent identity, role, temporal, and other contextual attributes as high-dimensional vectors. This framework enables the system to compare and relate these attributes mathematically rather than through rigid syntactic matching, allowing for dynamic, semantically governed authentication and authorization.

Scope of Embodiments

The embodiments described herein relate to systems and methods for identity authentication without passwords and for governance-controlled data transmission. While the invention may be implemented in various configurations, the following description focuses on an embodiment that constructs a composite identity object, referred to as a WISP, from multi-modal user inputs, evaluates the WISP against historical identity states, and enforces governance policies before permitting outbound actions.

Definition of WISP

A WISP (Weighted Identity Semantic Profile) is a composite identity object composed of one or more modality vectors that together represent the live state of a user or entity in a high-dimensional semantic space. In one embodiment, a WISP includes:

1. Narrative vector (v_narrative)—encodes the semantic meaning of a free-form narrative input.
2. Role vector (v_role)—encodes the user's current role or permission state.
3. Temporal vector (v_time)—encodes temporal information as a directional vector to enable drift detection.
4. Location vector (v_location)—encodes geospatial context for location-based verification.

The WISP is stored in a persistent semantic memory graph where each modality vector is connected to the composite node by typed edges. This representation allows the system to compare the live WISP with previously authenticated WISPs using mathematical similarity metrics, rather than relying on exact syntactic matches.

Narrative Embeddings—v_narrative

In conventional authentication systems, verification often depends on an exact syntactic match between a presented credential (e.g., a password string) and a stored reference value. In contrast, the present invention performs authentication by comparing the semantic meaning of a live input to a previously authenticated input. Both the live input and the baseline are converted into high-dimensional vector embeddings by a transformer-based model. Authentication is determined by measuring the proximity of these embeddings in semantic space (e.g., via cosine similarity) and verifying that the similarity meets or exceeds a defined threshold, thereby allowing recognition of equivalent meaning even when the wording differs.

Illustrative Example:

A baseline narrative is captured from a user via voice input: "I am Jane Smith, a nurse practitioner at Denver General Hospital, and I'm starting my shift." This audio is transcribed to text and embedded to form Baseline Vector A, which is stored in the persistent semantic memory graph.

Later, the same user provides a second voice input: "Starting my shift at Denver General Hospital—I'm Jane Smith, nurse practitioner." This input is similarly transcribed and embedded to form Live Vector B.

The system computes the cosine similarity between Live Vector B and Baseline Vector A. Despite differences in word order, the similarity score is 0.94, exceeding the acceptance threshold (e.g., 0.85). The system therefore recognizes the two narratives as semantically equivalent and permits authentication without requiring any static credential.

This example demonstrates that the invention does not validate static, fixed credentials. Instead, it validates whether a live representation of meaning is within an acceptable similarity threshold of a previously authenticated representation, enabling continuous and context-aware verification.

ROLE EMBEDDINGS—v_role

Role vectors are created using the same embedding methodology as narrative vectors. In both cases, a transformer model encodes the meaning of the input-whether it is a free-form narrative or a predefined role-into a high-dimensional vector representation. This allows role vectors to be stored, compared, and fused in the same mathematical space as narrative vectors, enabling consistent similarity measurement and integration within the WISP structure.

Temporal Directionality in Vector Space

In one embodiment, the system represents time as a directional vector in a continuous space, rather than as a static timestamp. This allows temporal states to be directly compared for similarity and drift without parsing or converting discrete strings or numeric formats.

For example, the time-of-day may be rendered onto a circular continuum analogous to a clock face, where the "minute hand" and "hour hand" are each represented as independent vectors in the space. A point on this continuum inherently conveys both position (absolute time) and direction (progression through the day).

In this representation, 23:59 and 00:01 appear as neighboring points with minimal angular separation, rather than as distant numeric values. This directional encoding allows the system to:

1. Compare events for temporal proximity using vector similarity metrics.
2. Detect deviations from expected temporal patterns ("temporal drift").
3. Maintain temporal context across different days, weeks, or other intervals.

When combined with other embeddings (e.g., narrative, role, location), this temporal representation becomes an active dimension of the WISP, enabling governance decisions that are sensitive to both what happened and when it occurred.

Fusion-Time Temporal Manifold Encoding—v_time

Time Embeddings Plain-Language Overview:

In some embodiments, the system strengthens identity verification by building "time awareness" directly into the Wisp at the moment of its creation. This means the system doesn't just verify who is interacting—it also evaluates when they act, relative to their established behavioral patterns. For example, a user who normally accesses the system each weekday at 9:00 a.m. will have a different temporal signature than the same user logging in at 2:00 a.m. from a new location. Embedding this temporal signature in the Wisp allows governance scoring to detect anomalies in real time and respond immediately, without relying on separate time-based checks after authentication.

Technical Embodiment

In one embodiment, the system computes a decay- and phase-aware temporal subvector during the fusion of modality vectors to form the Wisp. The temporal subvector is derived by: (i) computing elapsed time $\Delta t$ since the last verified interaction; (ii) calculating a decay coefficient $\lambda=\ln(2)/t\frac{1}{2}$ based on a configurable half-life ($t\frac{1}{2}$ in hours); and (iii) encoding one or more periodic phase features (e.g., daily, weekly, shift cycles) from the current timestamp. These components are combined into a compact temporal vector and fused with the narrative, role, and location vectors during Wisp creation. Two otherwise semantically identical Wisps, captured at different temporal phases, will therefore have distinct vector structures, enabling the governance engine to detect and act upon phase inconsistencies without a post-fusion temporal scoring pass. In preferred embodiments, $t\frac{1}{2}$ ranges from 24 to 720 hours, and the set of periodic cycles may include daily, weekly, and shift-based intervals. When temporal data is unavailable, the system may insert a neutral temporal subvector and increase governance thresholds for semantic coherence or role alignment. In alternative embodiments, temporal weighting is applied after initial fusion, although fusion-time encoding is preferred for improved phase sensitivity and reduced computational overhead.

In one embodiment, the temporal encoder module is implemented by a processor executing instructions stored in a non-transitory computer-readable medium. The processor is configured to receive a timestamp input, compute a decay coefficient according to a predetermined decay function, and generate a phase encoding using Fourier or cosine time encoding. These features are then integrated into the temporal vector before fusion with other modality vectors.

Governance Scoring and Evaluation

After constructing the WISP, the system evaluates it against one or more previously authenticated WISPs stored in the persistent semantic memory graph. In one embodiment, this evaluation includes:

Semantic Coherence Score-Calculated, for example, as cosine similarity between the fused vector representation of the live WISP and stored WISPs.

Trust Score-Derived from the semantic coherence score in combination with additional behavioral or contextual signals; may be adjusted over time according to an exponential decay function.

Drift Score-Computed by comparing temporal, location, or other contextual vectors for deviation beyond a predefined threshold.

Governance Thresholds

The trust and drift scores are evaluated against predetermined governance thresholds.

Governance Embeddings

A governance embedding is a high-dimensional vector representation of a policy constraint. In one embodiment, the semantic meaning of a policy-such as permitted roles, actions, or jurisdictions—is encoded using the same transformer-based model applied to WISP components. This enables direct mathematical comparison between governance embeddings and the multi-modal vectors of a WISP. By performing similarity checks and optional rule-based evaluations, the system can enforce fine-grained access control in alignment with stored policy constraints Decision States and Enforcement If either threshold is not satisfied, the system may block the outbound payload entirely, or apply alternate decision states such as delay or escalate.

Payload Approval and Provenance Tokening

When the thresholds are satisfied, the system permits the outbound payload and attaches a governance-bound provenance token. In one embodiment, this token is a crypto-graphically verifiable package containing:

The trust score at the time of decision,
The drift score,
A narrative hash,
Timestamp,
Role vector.

In some embodiments, the token combines vector representations of meaning with audit data, enabling independent downstream verification of the governance state without central callback.

Example: Governance-Bound Provenance Token (JSON Representation)

```
{
"provenance_token": {
"trust_score": 0.93,
"drift_score": 0.02,
"narrative_hash":
"b1946ac92492d2347c6235b4d2611184",
"timestamp": "2025-08-11 T14:32:45Z",
"role_vector": [0.134, 0.928, 0.445,–0.221, . . . ],
"modality_origin": {
"narrative": "voice_transcribed",
"role": "manual_entry",
"temporal": "system_clock",
"location": "gps_device"
"memory_lineage":    "session_id:8392f-45a9-9213|wisp_id:23aa48ef",
"compression_state": "orion_v1"
}
}
}
```

Explanation:

This JSON object illustrates one non-limiting embodiment of a governance-bound provenance token. Each field is cryptographically signed at creation and may be transmitted alongside the outbound payload. This allows downstream systems to independently verify the governance state, trust score, drift score, and identity attributes of the originating system without requiring a callback to the source.

External System Integration

Approved payloads with attached provenance tokens may be transmitted to downstream platforms such as Palantir Foundry. Foundry or similar systems can verify the token to confirm that the payload originated from an authenticated, governance-compliant state without re-authenticating the user.

Example End-to-End Flow

1. Capture input—user speaks a phrase containing role and contextual information.
2. Embed inputs—narrative, role, temporal, and location vectors are generated.
3. Fuse into WISP—vectors are combined and stored in the semantic memory graph.
4. Compute scores—semantic coherence, trust, and drift are calculated.
5. Evaluate thresholds—governance engine compares scores to predetermined thresholds and policies.
6. Decision—if thresholds met, attach provenance token and transmit payload; otherwise, block or escalate.

Edge Deployment and Functional Implementation

In some embodiments, the system is deployed on edge computing devices or gateways to enable local execution of the capture, vectorization, fusion, and governance processes described herein. The system has been reduced to practice in both cloud and edge environments, with all described modules and processes implemented by one or more processors executing stored program instructions. The present specification is based on a functioning implementation validated in live operational contexts.

FIG. 1—Semantic Identity and Governance System (Claim-Aligned)

FIG. 1 is a block diagram illustrating an example of a semantic identity authentication and governance-controlled data transmission system according to one embodiment of the invention (Claim 1). The system operates within an edge environment 115 (Claim 15) in which user inputs are acquired, embedded, fused into composite identity objects ("Wisps"), evaluated against governance policies, and—if permitted-transmitted with a governance-bound provenance token for downstream verification (Claims 1, 9, 19).

In the illustrated embodiment:

Multimodal Input Interface 100 (Claims 1, 13)

Receives narrative and contextual user inputs from one or more modalities, including but not limited to voice, video, typed text, biometric data, geolocation, device identifiers, behavioral data, and environmental signals. Inputs are normalized for downstream processing. While the present embodiment supports concurrent capture of multiple modalities, alternative embodiments may utilize sequential or single-modal capture, or integrate with external capture systems.

Transformer Embedder 101 (Claims 1, 4)

In the current embodiment, narrative and contextual inputs are vectorized using a transformer-based model, specifically a MiniLM variant optimized for edge environments. Narrative input is embedded into a high-dimensional semantic vector, and contextual modalities (voice, location, time, role, etc.) are embedded into corresponding modality-specific vectors. Alternative embodiments may employ other transformer architectures, non-transformer embedding models, or hybrid encoder pipelines.

Vector Embedding Module 102 (Claims 1, 2, 3, 4, 6, 7)

Organizes the output of the embedder into distinct vector classes, including:

Narrative Vector (v_narrative)—representing semantic meaning (Claim 1).
Modal Vectors (e.g., v_voice, v_video, v_text)—representing modality-specific features (Claim 1).
Location Vector (v_location)—representing spatial coordinates or derived embeddings (Claims 1, 6).
Time Vector (v_time)—representing temporal features, including elapsed time $\Delta t$, decay coefficient $\lambda$, and Fourier/cosine phase encodings (Claims 1, 7, 8).
Role Vector (v_role)—representing the user's role or permission state (Claims 1, 3).

Other embodiments may substitute, augment, or omit vector classes, provided they can be fused into a composite identity object.

Fusion Engine 103 (Wisp Creation) (Claims 1, 2, 10)

Combines the narrative vector, contextual vectors, and temporal subvector into a composite identity object ("Wisp"). Appends a semantic header containing modality origin, memory lineage, and compression state metadata (Claims 1, 9, 11). Current implementation uses concatenation and normalization; alternative embodiments may employ learned fusion layers, attention-based aggregation, or graph-based assembly.

Compression Engine 104 (Claim 11)

Optionally reduces vector dimensionality before storage or transmission. A compression header is recorded, containing the model identifier, original dimensionality, and cosine-fidelity score relative to an uncompressed baseline. Present embodiment applies compression if dimensionality exceeds a threshold; alternative embodiments may use lossy, lossless, or adaptive compression, or bypass compression entirely.

Wisp Store/Persistent Semantic Memory Graph 105 (Claims 1, 10, 18)

Maintains Wisps as nodes connected via typed edges (e.g., has_narrative, has_role, has_temporal, has_location) to their component vectors (Claim 10). In the present embodiment, the store is implemented as a vector database with graph indexing (Claim 18). Alternative embodiments may use relational or document stores with vector search capabilities, provided they preserve identity, relationships, and provenance.

Evaluation Engine 106 (Claims 1, 2, 3, 4, 5, 6, 7)

Computes:

Semantic Coherence Score—e.g., cosine similarity to prior authenticated Wisps (Claims 1, 2).

Trust Coefficient—derived from coherence, drift, and role alignment (Claims 1, 3).

Role Alignment Score—weighted cosine similarity between v_role and governance role vectors (Claim 3).

Compression Fidelity Evaluation—ensuring similarity between compressed and original vectors (Claim 11).

Scores are compared against governance thresholds to inform decision states (Claims 1, 4, 5).

Decision Confidence Metric 107 (Claims 1, 4, 5)

Quantifies certainty of the evaluation outcome, passed to the governance engine. Current embodiment produces a normalized value (0-1) based on score variances and stability; alternative embodiments may use statistical intervals, probabilities, or fuzzy logic measures.

Governance Engine 108 (Permit/Delay/Escalate/Deny) (Claims 1, 4, 5)

Applies policy constraints and governance embeddings to determine decision states: permit, delay, escalate, or deny. Present embodiment uses vector similarity plus rule-based logic; alternative embodiments may integrate with external policy systems, human-in-the-loop review, or ML models trained on governance outcomes.

Optional Auto-Calibrate Function 109 (Claim 14)

Adjusts governance thresholds based on observed authentication performance, false positive rates, and drift patterns. Present embodiment sources calibration data from recent evaluation logs; alternative embodiments may perform continuous, periodic, or external calibration.

Provenance Record 110 (Claims 1, 9, 12)

Generates a governance-bound provenance record containing trust scores, drift scores, narrative hashes, timestamps, role vectors, and compression states. In the present system, the record is cryptographically signed for tamper resistance (Claim 9). Alternative embodiments may store in a distributed ledger, centralized repository, or edge cache.

Governance/Policy Embedding 111 (Claims 1, 4)

Encodes policy constraints as high-dimensional vectors from a transformer-based model (Claim 4). These embeddings represent governance rules, compared to the Wisp for alignment. Alternative embodiments may store policies as symbolic logic, rule sets, or hybrid vector-symbolic structures.

Tamper-Evident Audit Logger/Decision Record 112 (Claims 1, 12)

Records all governance decisions and provenance data in an append-only, tamper-evident audit log (Claim 12). Current embodiment uses cryptographic hash chains; alternative embodiments may employ blockchain, secure enclaves, or hardware write-once logging.

Providence Token 113 (Claims 1, 9, 19, 20)

Upon a permit decision state, attaches a governance-bound provenance token to outbound data payloads (Claim 1). Token is cryptographically signed and includes trust score, drift score, narrative hash, timestamp, role vector, and compression state (Claim 9). Downstream systems may verify the token without callback (Claims 19, 20). Alternative embodiments may vary token format or signing scheme.

Foundry/External Data Transmission 114 (Claims 1, 19, 20)

Transmits governance-approved data with attached provenance token to external systems (e.g., Palantir Foundry) over secure, encrypted channels (Claim 19). Alternative embodiments may integrate with other ontology platforms, data lakes, or operational systems.

Edge Environment 115 (Claims 1, 15)

Executes all processing steps within a controlled edge computing environment (Claim 15), such as a secure gateway or on-device enclave, minimizing exposure to untrusted networks. Alternative embodiments may distribute components across edge, on-premises, and cloud infrastructure, provided governance and provenance mechanisms remain intact.

FIG. 2—User Input and Wisp Creation (Claim-Aligned)

FIG. 2 is a process diagram illustrating one embodiment of the system's multimodal input acquisition, embedding, fusion, storage, and audit logging stages for semantic identity authentication and governance-controlled data transmission (Claim 1). In the present embodiment, the process is divided into five stages-Input (201), Embedding (202), Fusion (203), Store (204), and Audit (205)—with each stage corresponding to specific elements of Claim 1 and its dependent claims.

Input 201 (Claims 1, 13)

Receives heterogeneous user input comprising at least:

A narrative modality (e.g., typed text, speech transcription) (Claim 1), and

One or more additional modalities selected from temporal, role, location, biometric, device, behavioral, or environmental inputs (Claim 1).

In the illustrated embodiment, five concurrent inputs are depicted: narrative, modal (e.g., voice), temporal, location, and role. The system supports additional modalities, including biometric, image, or sensor data, without departing from the invention's scope. Inputs may be captured concurrently (Claim 13) or sequentially in alternative embodiments.

Embedding 202 (Claims 1, 2, 3, 4, 6, 7, 8)

Each modality or contextual signal is embedded into a high-dimensional vector representation:

v_narrative—semantic embedding of narrative meaning (Claim 1).

v_modal—modality-specific features (e.g., voice characteristics) (Claim 1).

v_time—temporal features, including:

(a) elapsed-time value (Claim 1a);

(b) decay coefficient $\lambda = \ln 2/\text{half-life}$ (Claim 1b, Claim 8); and (c) phase features from Fourier- or cosine-based time encoding (Claim 1c).

v_location—geospatial context (Claims 1, 6).

v_role—role or ontological context (Claims 1, 3).

Transformer-based embedding models may be used for governance embeddings (Claim 4). Alternative embodiments may employ other embedding architectures or hybrid pipelines.

Fusion 203 (Claims 1, 2, 9, 10, 11)

The Fusion Engine combines the narrative vector, temporal subvector, and contextual vectors into a composite Wisp. The Wisp contains a semantic header including at least modality origin, memory lineage, and compression state (Claims 1, 9).

In the present embodiment, the composite may be optionally processed by Orion, a compression module that records a compression header with model identifier, dimensionality, and cosine-fidelity score (Claim 11). Alternative embodiments may omit compression or use adaptive techniques.

Store 204 (Claims 1, 10, 18)

The Wisp (compressed or uncompressed) is stored in a persistent semantic memory graph (Claim 1) as a node connected via typed edges (e.g., has_narrative, has_role, has_temporal, has_location) to its modality vectors (Claim 10).

In the present embodiment, storage is implemented in a vector database with graph indexing (Claim 18). Alternative embodiments may use relational or document-based stores with vector search, provided they preserve identity relationships and provenance.

Audit 205 (Claims 1, 9, 12)

All relevant inputs, embeddings, fusion outputs, and system decisions are recorded in an append-only, tamper-evident audit log (Claim 12). The audit trail supports compliance, replay resistance, and downstream verification when paired with a governance-bound provenance token (Claims 1, 9).

Alternative embodiments may implement audit logging using blockchain, secure enclaves, or hardware write-once mechanisms.

Scope Note:

While FIG. 2 details the acquisition-to-storage pipeline, governance evaluation, decision-state selection, and provenance-token attachment (Claims 1, 4, 5, 14, 19, 20) may occur immediately after the Store (204) stage or as depicted in subsequent figures.

FIG. 3—Authentication Data Flow

FIG. 3 is a process diagram illustrating an example of a semantic identity authentication and governance-controlled data transmission method according to one embodiment of the invention (Claim 1). The method receives multi-modal user input, embeds the input into modality-specific vectors including a temporal subvector with decay and phase features, fuses these into a composite identity object ("Wisp"), evaluates the Wisp against stored authenticated Wisps and governance policies, and—if permitted-attaches a governance-bound provenance token to outbound data for downstream verification without callback.

Input Stage 301 (Claims 1, 13)

Receives user input comprising at least a narrative modality (e.g., streaming voice transcribed to text) and one or more additional modalities such as temporal, role, location, biometric, device, behavioral, or environmental. In the present embodiment, narrative capture and contextual capture (e.g., device/location) may occur concurrently.

Embedding Stage 302 (Claims 1, 2, 3, 4, 6, 7, 8)

Each modality is embedded into a corresponding vector:

Narrative Vector (v_narrative)—high-dimensional semantic embedding of narrative content (Claim 1).

Role Vector (v_role)—embedding representing the user's role or ontological permission state (Claims 1, 3).

Temporal Subvector (v_temporal_subvector)—includes:
(a) elapsed-time since last verified interaction;
(b) decay coefficient $\lambda=\ln(2)/$half-life, where half-life is configurable between 24-720 hours (Claims 1, 8); and
(c) phase features from Fourier-based or cosine-based time encoding (Claim 1).

Other contextual vectors (e.g., v_location, v_device) may be embedded as needed in alternative embodiments.

Fusion Stage 303 (Claims 1, 2, 9, 10, 11)

The narrative vector, temporal subvector, role vector, and any additional contextual vectors are fused into a composite identity object ("Wisp"). A semantic header is appended, comprising modality origin, memory lineage, and compression state metadata (Claim 1). Alternative embodiments may apply compression at this stage per Claim 11.

Retrieve & Compare Stage 304 (Claims 1, 2, 3, 4, 6, 10, 18)

The Wisp is stored in and compared against a persistent semantic memory graph, where each Wisp is a node connected by typed edges (e.g., has_narrative, has_role, has_temporal, has_location) to its modality vectors (Claim 10). The system computes:

Semantic Coherence Score—cosine similarity between the fused Wisp vector and one or more previously authenticated Wisps (Claims 1, 2);

Trust Score—based on coherence, drift, and role alignment (Claims 1, 3);

Drift Score—from temporal/location changes exceeding thresholds (Claims 1, 6); and Role-Alignment Score—weighted cosine similarity between v_role and governance role vectors (Claim 3).

Governance Stage 305 (Claims 1, 4, 5, 7, 14)

Scores are evaluated against governance thresholds and, optionally, governance embeddings encoding policy constraints as high-dimensional vectors (Claim 4). If the semantic coherence or related trust measure falls in a defined uncertainty interval, the decision state may be delay or escalate (Claim 5). When temporal data is unavailable, a neutral temporal subvector is used and thresholds are raised (Claim 7). Thresholds may be automatically calibrated based on observed authentication success rates, false positives, and drift patterns (Claim 14).

Provenance Token Stage 306 (Claims 1, 9, 12, 19, 20)

When the decision state is permit, the system constructs a governance-bound provenance token containing at least the trust score, drift score, narrative hash, timestamp, role vector, modality origin, memory lineage, and compression state (Claims 1, 9). The token is cryptographically signed, recorded in an append-only, tamper-evident audit log (Claim 12), and attached to the outbound payload (Claim 1) for transmission via API 308 (Claim 19). Downstream systems may verify the token by signature and field consistency without callback to a central authority (Claim 20).

Logging & Storage Stage 307 (Claims 1, 12)

All decision states and attached tokens are recorded in local storage in a tamper-evident, append-only format (Claim 12). Alternative embodiments may store these records in a distributed ledger or secure enclave.

FIG. 4—Drift Detection Logic and Time-Aware Query Handling (Claim-Aligned)

FIG. 4 is a flowchart illustrating an example embodiment of drift detection logic and time-aware query handling within the semantic identity authentication and governance-controlled data transmission method (Claim 1). This embodiment begins with receipt of a subsequently generated composite identity object ("Wisp") and selectively applies drift analysis before producing a governance decision.

Step 401—Receive User Input/Construct Current Wisp (Claims 1, 13)

The system receives a subsequently generated Wisp comprising at least a narrative modality and one or more additional modalities selected from temporal, role, location, biometric, device, behavioral, or environmental. In the present embodiment, narrative input may be derived from streaming voice transcribed to text, with device and location vectors captured concurrently.

Step 402—Retrieve Prior Wisps/Compute Semantic Coherence (Claims 1, 2, 6, 10, 18)

The system retrieves one or more previously authenticated Wisps for the same identity from a persistent semantic memory graph in which each Wisp is a node connected by typed edges (has_narrative, has_role, has_temporal, has_location). It computes a semantic coherence score between the current Wisp and stored Wisps, for example using cosine similarity between the fused Wisp vector and prior authenticated Wisps.

Step 403—Threshold Check for Coherence (Claims 1, 4, 5)

The semantic coherence score is compared to a governance threshold. If the score meets or exceeds the threshold, the process may bypass drift analysis and proceed directly to governance evaluation (Step 409). If the score is below the threshold, the process advances to drift detection (Step 405).

Step 405—Drift Check (Claims 1, 6, 7, 8)

The system computes a temporal subvector comprising:

(a) an elapsed-time value since the last verified interaction;

(b) a decay coefficient $\lambda = \ln(2)/\text{half-life}$, with the half-life configurable between 24 and 720 hours; and (c) one or more phase features from Fourier-based or cosine-based time encoding.

The system then evaluates temporal similarity between the current and prior Wisps, detecting deviations in time-of-occurrence patterns. It optionally evaluates location vector changes or other contextual vector changes. When temporal data is unavailable, a neutral temporal subvector is used and one or more governance thresholds are raised.

Step 406—Drift Decision (Claims 1, 5, 6)

If no drift is detected, the process proceeds to Step 409. If drift is detected, the request handling path is modified according to governance policy by applying delay, escalation, or denial.

Step 409—Governance Evaluation (Claims 1, 3, 4, 5, 14)

The current Wisp is evaluated against role vectors and governance embeddings representing policy constraints, optionally in combination with symbolic policy rules. A role-alignment score may be computed as a weighted cosine similarity between the Wisp's role vector and a stored governance role vector, combined with trust and drift scores. Governance thresholds may be automatically calibrated based on observed authentication performance, false positive rates, and measured drift patterns. The system outputs a decision state such as PERMIT, DELAY, ESCALATE, or DENY.

FIG. 5—Wisp Object Schematic

FIG. 5 is a schematic diagram illustrating the internal structure of a composite identity object ("Wisp") and its relationships to semantic memory, provenance metadata, and trust scoring within the semantic identity authentication and governance-controlled data transmission system (Claim 1).

Wisp Structure 501 (Claims 1, 2, 3, 6, 7, 8, 9, 10)

The Wisp is composed of:

Narrative Vector (v_narrative)—the primary semantic embedding of the user's narrative modality (Claim 1).

Contextual Vectors—embeddings of non-narrative modalities, which may include:

Temporal Vector (v_time)—comprising: (a) elapsed-time since the last verified interaction; (b) a decay coefficient $\lambda = \ln(2)/\text{half-life}$, with half-life configurable between 24 and 720 hours (Claims 1($c$), 7, 8); and (c) one or more phase features derived from Fourier-based or cosine-based time encoding (Claim 1(c)).

Location Vector (v_location)—embedding representing spatial coordinates or derived geospatial features (Claims 1, 6, 10).

Modal Vectors (v_voice, v_video, etc.)—embeddings representing additional physical or digital modalities such as voice, video, keystroke, or environmental sensors (Claim 1).

Role Vector (v_role)—embedding representing the user's role or ontological permission state (Claims 1, 3).

The Wisp also maintains a semantic header (Claim 1, 9, 11) including modality origin, memory lineage, and compression state, used for provenance tracking and fidelity management.

Semantic Memory 502 (Claims 1, 10, 18)

Wisps are stored in a persistent semantic memory graph in which each Wisp is a node connected by typed edges (e.g., has_narrative, has_role, has_temporal, has_location) to its component vectors (Claim 10). In the present embodiment, the semantic memory is implemented as a vector database with graph indexing (Claim 18), enabling efficient retrieval for coherence, drift, and role-alignment comparisons.

Provenance Metadata 503 (Claims 1, 9, 11, 12, 19, 20)

Provenance metadata includes cryptographically signed fields such as trust score, drift score, narrative hash, timestamp, role vector, modality origin, memory lineage, and compression state (Claim 9). These fields form the basis of the governance-bound provenance token (Claims 1, 19, 20) and are stored in an append-only, tamper-evident audit log (Claim 12).

Trust Scores 504 (Claims 1, 2, 3, 4, 5, 6)

Trust scores are derived from semantic coherence measures, drift scores, and role-alignment scores (Claims 1, 2, 3, 6). These scores are evaluated against governance thresholds and, optionally, governance embeddings representing policy constraints (Claim 4), to produce a decision state such as permit, delay, escalate, or deny (Claim 5).

Alternative embodiments may omit certain vectors, add new modality vectors, or alter the internal representation of the Wisp, provided that the resulting object preserves the capability to represent a multi-modal, semantically fused identity with governance-tracked provenance.

FIG. 6—Orion Compression and Rehydration (Claim-Aligned)

FIG. 6 is a process diagram illustrating one embodiment of a vector compression and rehydration subsystem ("Orion") within the semantic identity authentication and governance-controlled data transmission system. This embodiment applies a compression scheme to one or more vectors of a composite identity object ("Wisp"), records a compression header with fidelity metadata, and rehydrates compressed vectors on retrieval, consistent with Claim 11.

Input Stage 601 (Claims 1, 9, 11)

The subsystem receives one or more component vectors of a Wisp, such as:

Narrative/Text Vector (v_text)—high-dimensional semantic embedding (e.g., =768 dimensions).

Voice Vector (v_voice)—acoustic/phonetic embedding (e.g., =192 dimensions).

Other contextual vectors (e.g., temporal, role, location) may be captured separately and optionally bypass compression in certain embodiments.

Embedding Identification 602-603 (Claims 1, 11)

The vectors are tagged by modality type prior to compression. This enables modality-specific projection transforms and fidelity thresholds.

Compression Stage 604 (Claim 11)

The Orion Compression Module applies a projection-based transform (e.g., PCA or other dimensionality-reduction technique) to reduce vector dimensionality while retaining semantic integrity. Output includes:

Compressed Text Vector (v_text(c))—605

Compressed Voice Vector (v_voice(c))—606

Fidelity Evaluation Path 607-609 (Claim 11)

The Rehydration Module (607) performs an inverse transform on the compressed vector to recover an approximation of the original. A Fidelity Check (608) computes cosine similarity between the original and rehydrated vectors, comparing the score to a fidelity threshold τ_f (per modality). If the cosine similarity meets or exceeds τ_f, compression is accepted. If the similarity falls below τ_f, the system either:

Adjusts the number of retained components, or

Marks the vector as non-compressible and logs the event (609).

Persistent Storage Stage 610-611 (Claims 1, 9, 10, 11, 18)

Accepted compressed vectors are persisted in a vector database (Claim 18) as part of the persistent semantic memory graph (Claim 10). Each stored record includes a compression header containing:

model_id (compression model identifier)

modality orig_dim (original dimensionality)

comp_dim (compressed dimensionality)

τ_f (fidelity threshold)

cosine_fidelity (achieved score relative to uncompressed)

timestamp user_id fusion_shape_metadata (optional, e.g., for multi-vector fusion layouts)

These header fields form part of the Wisp's semantic header and may be included in a governance-bound provenance token (Claims 1, 9).

Retrieval & Rehydration Stage 612-613 (Claim 11)

On retrieval, the Retrieval Module loads the compression headers and applies the inverse transform to restore the embedding to its original dimensionality (612). The Rehydrated Embedding(s) (613) are then available for comparison, fusion, or other downstream processing in the identity authentication pipeline.

Alternative Embodiments

While this embodiment shows compression of text and voice vectors, alternative embodiments may compress other contextual vectors (e.g., temporal, location, role) or apply hybrid lossy/lossless schemes. Fidelity thresholds τ_f may be static or dynamically adjusted based on performance metrics (Claim 14).

FIG. 7—Governance Embedding and Role Vectors (Dual Swim Lane) (Claim-Aligned)

FIG. 7 is a schematic diagram illustrating the relationship between role vectors and governance embeddings within the semantic identity authentication and governance-controlled data transmission system. This embodiment depicts a dual swim lane arrangement, with the Role Vector Layer (701) on the left and the Governance Embedding Layer (702) on the right, consistent with the role-alignment and governance evaluation steps of Claim 1.

Role Vector Layer 701 (Claims 1, 3)

This layer contains high-dimensional vector representations of user roles derived from the Wisp's role modality (Claim 1). Examples include:

v_role_user (703)—a general user role vector.

v_role_nurse_lpn (705)—a licensed practical nurse role vector.

v_role_doctor (707)—a physician role vector.

v_role_janitor (709)—a facilities role vector.

These vectors are generated by embedding role-related attributes of the user, such as organizational position, access level, and operational function.

Governance Embedding Layer 702 (Claims 1, 4)

This layer contains governance embeddings, which are high-dimensional vector representations of policy constraints produced by a transformer-based model (Claim 4). Examples include:

Policy Rule Vector A (v_rule_a) (704)—encodes a specific governance policy or access constraint.

Policy Rule Vector B (v_rule_b) (706)—encodes a second governance policy or constraint.

Constitution Vector (v_constitution) (708)—encodes a foundational governance framework or higher-order policy set, serving as a root constraint for all subordinate policies.

Role-to-Governance Mapping (Claims 1, 3, 4)

Arrows between role vectors and governance embeddings represent the process of computing a role-alignment score (Claim 3)—for example, by calculating a weighted cosine similarity between a role vector (e.g., v_role_doctor) and one or more governance embeddings (e.g., v_rule_a, v_constitution). These scores may be combined with trust and drift scores to evaluate whether a given Wisp meets the governance thresholds specified in Claim 1.

Alternative Embodiments

While FIG. 7 depicts discrete role and governance vectors, alternative embodiments may:

Represent multiple governance constraints as a composite embedding.

Dynamically generate governance embeddings from natural language policy descriptions.

Incorporate symbolic logic checks in parallel with vector similarity scoring (Claim 4).

FIG. 8—Graph-Based Wisp Storage (Claim-Aligned)

FIG. 8 is a schematic diagram illustrating a persistent semantic memory graph for storing composite identity objects ("Wisps") and their associated modality vectors, provenance metadata, and trust metrics in the semantic identity authentication and governance-controlled data transmission system. This figure aligns with Claim 10, which specifies typed edges between a Wisp node and its component vectors, and extends to other claim elements by showing the storage of provenance and trust data for governance evaluation.

Wisp Node 804 (Claims 1, 9, 10, 12)

Each Wisp is represented as a unique node in the semantic memory graph, identified by a WISP ID. The node is connected via typed edges to all associated vectors and metadata objects. Stored Wisps include a semantic header containing modality origin, memory lineage, and compression state (Claim 1), and may also reference governance-bound provenance tokens (Claim 9).

Typed Edges (Claim 10)

The Wisp node connects to its components via typed edges:

has_narrative→Narrative Vector (803)—high-dimensional semantic embedding of narrative input.

has_role→Role Vector (802)—embedding representing the user's ontological role or permission state (Claims 1, 3).

has_temporal→Temporal Vector (806)—see detailed time modeling below.

has_location→Location Vector (801)—geospatial embedding or derived location features (Claims 1, 6).

has_modal→Modal Vector (805)—additional modality embeddings (e.g., voice, video, keystroke) (Claim 1).

has_provenance→Provenance Metadata Node (807)-structured data including fields from Claim 9 (trust score, drift score, narrative hash, timestamp, role vector, modality origin, memory lineage, compression state) and recorded in an append-only, tamper-evident audit log (Claim 12).

has_trust→Trust Score Node (808)—computed trust metric derived from semantic coherence, drift, and role-alignment scoring (Claims 1, 2, 3, 4, 5, 6).

Temporal Vector 806—Detailed Time Modeling (Claims 1(c), 6, 7, 8)

The temporal vector stores the time-based component of the Wisp and is modeled as a temporal subvector comprising:

1. Elapsed-Time Value—$\Delta t$ since the last verified interaction for the same identity (Claim 1(c)).
2. Decay Coefficient—$\lambda=\ln(2)/\text{half-life}$, with half-life configurable between 24 and 720 hours (Claim 8).
3. Phase Features—periodicity encodings derived from Fourier-based or cosine-based transforms to capture cyclical patterns such as daily, weekly, or seasonal usage rhythms.

The system may also maintain multi-scale temporal embeddings (short-term, mid-term, long-term) and store historical temporal similarity measures to support drift detection (Claim 6).

When temporal data is unavailable, a neutral temporal subvector is substituted and one or more governance thresholds are increased (Claim 7).

Provenance Metadata Node 807 (Claims 1, 9, 11, 12)

Stores cryptographically signed provenance information tied to the Wisp, including semantic header fields and, if applicable, compression headers as described in Claim 11. Provenance records are maintained in an append-only, tamper-evident audit log (Claim 12), and may be transmitted as part of a governance-bound provenance token (Claims 1, 9, 19, 20).

Trust Score Node 808 (Claims 1, 2, 3, 4, 5, 6)

Represents a persistent trust metric for the Wisp, calculated by combining:

Semantic Coherence Score—cosine similarity to previously authenticated Wisps (Claims 1, 2).

Drift Score—based on temporal/location change analysis (Claim 6).

Role-Alignment Score—weighted cosine similarity between v_role and governance role vectors (Claim 3).

Trust scores are evaluated against governance thresholds and policy embeddings to determine decision states such as permit, delay, escalate, or deny (Claims 1, 4, 5).

Alternative Embodiments

While FIG. 8 depicts a simplified star topology, alternative embodiments may:

Use multi-hop edges for hierarchical role or policy structures.

Integrate versioned Wisp nodes for longitudinal tracking.

Store intermediate evaluation metrics or decay curves as separate nodes for advanced auditing.

What is claimed is:

1. A computer-implemented method for semantic identity authentication and governance-controlled data transmission, the method comprising:

receiving user input comprising at least a narrative modality and one or more additional modalities selected from temporal, role, location, biometric, device, behavioral, or environmental;

embedding the narrative modality into a narrative vector and embedding each additional modality into a corresponding contextual vector;

during fusion of the vectors, computing a temporal subvector comprising:

(a) an elapsed-time value representing the time interval since a last verified interaction;

(b) a decay coefficient determined as the natural logarithm of two divided by a configurable half-life value, the half-life representing the duration over which the value is reduced by half; and (c) one or more phase features obtained through a time-encoding process, comprising Fourier-based encoding or cosine-based encoding;

fusing the narrative vector, the temporal subvector, and the one or more contextual vectors into a composite identity object ("Wisp") including a semantic header comprising at least modality origin, memory lineage, and compression state;

storing the Wisp in a persistent semantic memory graph in which the Wisp is a node connected by typed edges to nodes representing its modality vectors;

computing, for the Wisp, a semantic coherence score, a trust score, and a drift score by comparison to one or more previously authenticated Wisps stored in the semantic memory graph;

evaluating the scores against governance thresholds and optionally one or more governance embeddings representing policy constraints to select a decision state comprising at least one of: permit, delay, escalate, or deny; and when the decision state is permit, attaching to an outbound payload a governance-bound provenance token comprising a cryptographically verifiable representation of at least the trust score, the drift score, a narrative hash, a timestamp, and a role vector, thereby enabling independent downstream verification of a governance state without a central callback.

2. The method of claim 1, wherein the semantic coherence score is computed using cosine similarity between a fused vector representation of the Wisp and previously authenticated Wisps.

3. The method of claim 1, further comprising computing a role-alignment score using weighted cosine similarity between a role vector of the Wisp and a stored governance role vector, and wherein evaluating the governance thresholds comprises combining the role-alignment score with the trust score and the drift score.

4. The method of claim 1, wherein the governance embeddings encode policy constraints as high-dimensional vectors produced by a transformer-based model, and evaluating the governance thresholds comprises comparing the Wisp to governance embeddings using vector similarity and optional rule-based checks.

5. The method of claim 1, wherein the decision state is delay or escalate when the semantic coherence score or a related trust measure falls within a defined uncertainty interval.

6. The method of claim 1, further comprising detecting identity drift by comparing at least a temporal vector or a location vector of the Wisp to corresponding vectors of previously authenticated Wisps and identifying changes exceeding a predefined threshold.

7. The method of claim 1, wherein when temporal data is unavailable a neutral temporal subvector is used and at least one governance threshold for semantic coherence or role alignment is increased.

8. The method of claim 1, wherein the half-life value is configurable within a range of 24 to 720 hours.

9. The method of claim 1, wherein the governance-bound provenance token includes cryptographically signed fields for each of the trust score, drift score, narrative hash, timestamp, role vector, modality origin, memory lineage, and compression state.

10. The method of claim 1, wherein the persistent semantic memory graph uses typed edges comprising at least has_narrative, has_role, has_temporal, and has location.

11. The method of claim 1, further comprising, prior to storing the Wisp, compressing one or more vectors of the Wisp according to a compression scheme that records a compression header with model identifier, dimensionality, and an achieved cosine-fidelity measure relative to an uncompressed baseline, and rehydrating a compressed vector when a fidelity threshold is not met.

12. The method of claim 1, further comprising maintaining an append-only, tamper-evident audit log of decision states and attached governance-bound provenance tokens.

13. The method of claim 1, wherein receiving the user input comprises receiving a streaming voice input that is transcribed for narrative embedding while device and location modalities are captured concurrently.

14. The method of claim 1, further comprising automatically calibrating at least one governance threshold based on observed authentication success rates, false positive rates, and measured semantic drift patterns.

15. The method of claim 1, wherein the method is executed on an edge computing device or gateway.

16. A system comprising one or more processors and memory storing instructions that, when executed by the one or more processors, cause the system to execute operations comprising:

receiving user input comprising at least a narrative modality and one or more additional modalities selected from temporal, role, location, biometric, device, behavioral, or environmental;

embedding the narrative modality into a narrative vector and embedding each additional modality into a corresponding contextual vector;

during fusion of the vectors, computing a temporal subvector comprising:

(a) an elapsed-time value representing the time interval since a last verified interaction;

(b) a decay coefficient determined as the natural logarithm of two divided by a configurable half-life value, the half-life representing the duration over which the value is reduced by half; and (c) one or more phase features obtained through a time-encoding process, comprising Fourier-based encoding or cosine-based encoding;

fusing the narrative vector, the temporal subvector, and the one or more contextual vectors into a composite identity object ("Wisp") including a semantic header comprising at least modality origin, memory lineage, and compression state;

storing the Wisp in a persistent semantic memory graph in which the Wisp is a node connected by typed edges to nodes representing its modality vectors;

computing, for the Wisp, a semantic coherence score, a trust score, and a drift score by comparison to one or more previously authenticated Wisps stored in the semantic memory graph;

evaluating the scores against governance thresholds and optionally one or more governance embeddings representing policy constraints to select a decision state comprising at least one of: permit, delay, escalate, or deny; and when the decision state is permit, attaching to an outbound payload a governance-bound provenance token comprising a cryptographically verifiable representation of at least the trust score, the drift score, a narrative hash, a timestamp, and a role vector, thereby enabling independent downstream verification of a governance state without a central callback.

17. A non-transitory computer-readable medium storing instructions that, when executed by one or more processors, cause the one or more processors to perform operations comprising:

receiving user input comprising at least a narrative modality and one or more additional modalities selected from temporal, role, location, biometric, device, behavioral, or environmental;

embedding the narrative modality into a narrative vector and embedding each additional modality into a corresponding contextual vector;

during fusion of the vectors, computing a temporal subvector comprising:

(a) an elapsed-time value representing the time interval since a last verified interaction;

(b) a decay coefficient determined as the natural logarithm of two divided by a configurable half-life value, the half-life representing the duration over which the value is reduced by half; and (c) one or more phase features obtained through a time-encoding process, such as comprising Fourier-based encoding or cosine-based encoding;

fusing the narrative vector, the temporal subvector, and the one or more contextual vectors into a composite identity object ("Wisp") including a semantic header comprising at least modality origin, memory lineage, and compression state;

storing the Wisp in a persistent semantic memory graph in which the Wisp is a node connected by typed edges to nodes representing its modality vectors;

computing, for the Wisp, a semantic coherence score, a trust score, and a drift score by comparison to one or more previously authenticated Wisps stored in the semantic memory graph;

evaluating the scores against governance thresholds and optionally one or more governance embeddings representing policy constraints to select a decision state comprising at least one of: permit, delay, escalate, or deny; and when the decision state is permit, attaching to an outbound payload a governance-bound provenance token comprising a cryptographically verifiable representation of at least the trust score, the drift score, a narrative hash, a timestamp, and a role vector, thereby enabling independent downstream verification of a governance state without a central callback.

18. The system of claim 16, wherein the memory stores a vector database representing the persistent semantic memory graph and an embedding service configured to generate the narrative and contextual vectors.

19. The system of claim 16, wherein the one or more processors are further configured to attach the governance-bound provenance token to the outbound payload upon the permit decision state and transmit the outbound payload for downstream verification without callback.

20. The non-transitory computer-readable medium of claim 17, wherein the instructions further cause verification of an incoming governance-bound provenance token by cryptographic signature validation and field consistency checks without callback to a source authority.

* * * * *